Sept. 1, 1953   W. J. ZAROFF ET AL   2,650,518
APPARATUS FOR MEASURING FEET
Filed March 22, 1951   4 Sheets-Sheet 1

INVENTORS
William J. Zaroff
and Ladislav Boor
BY
W. J. Eccleston
ATTORNEY

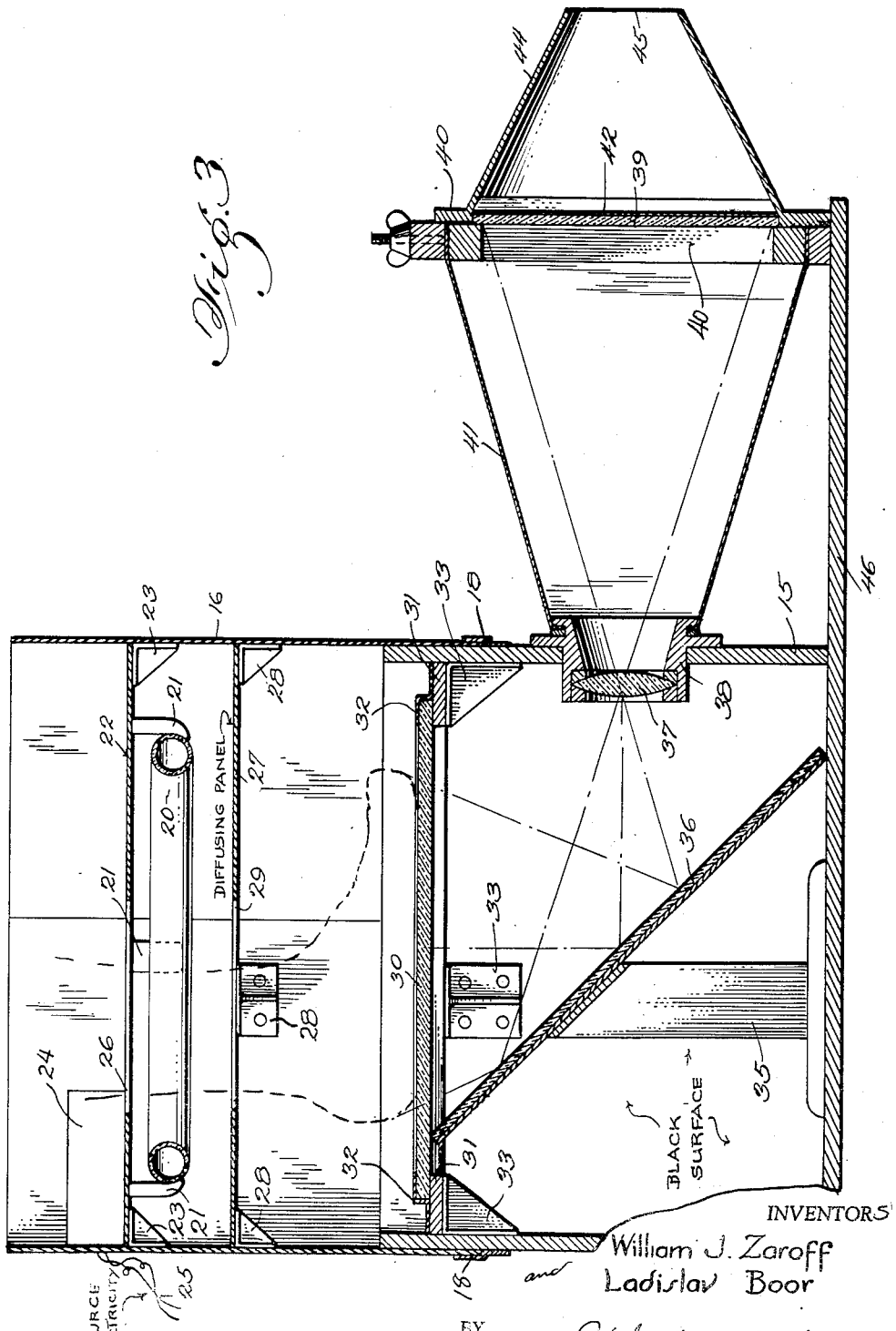

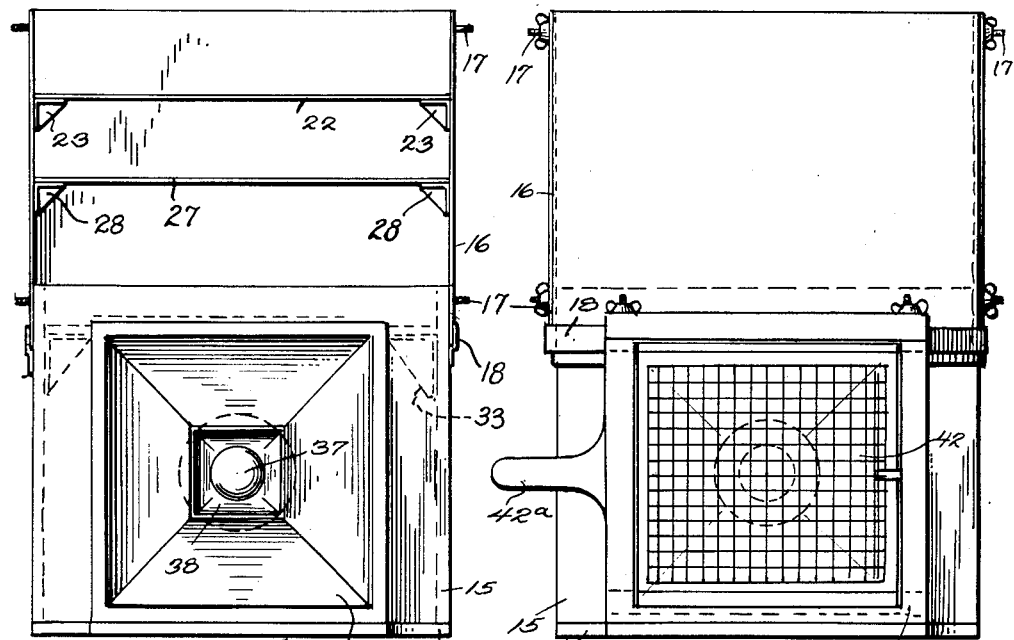
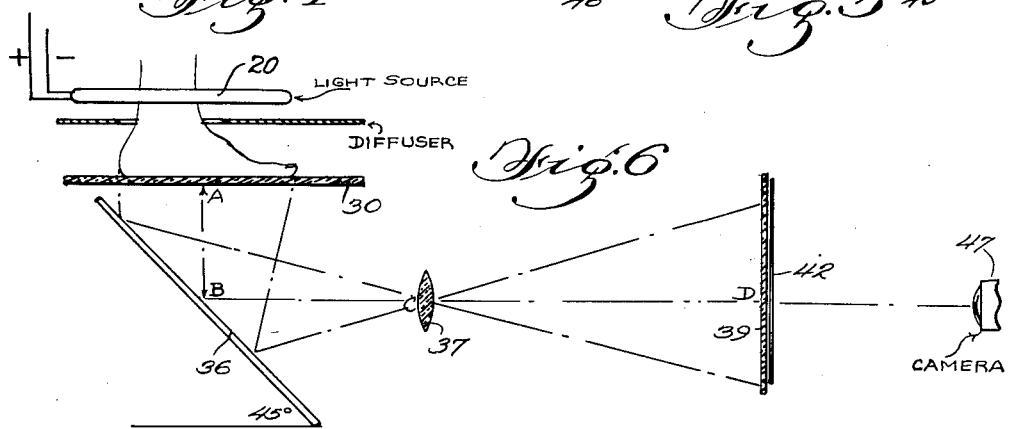
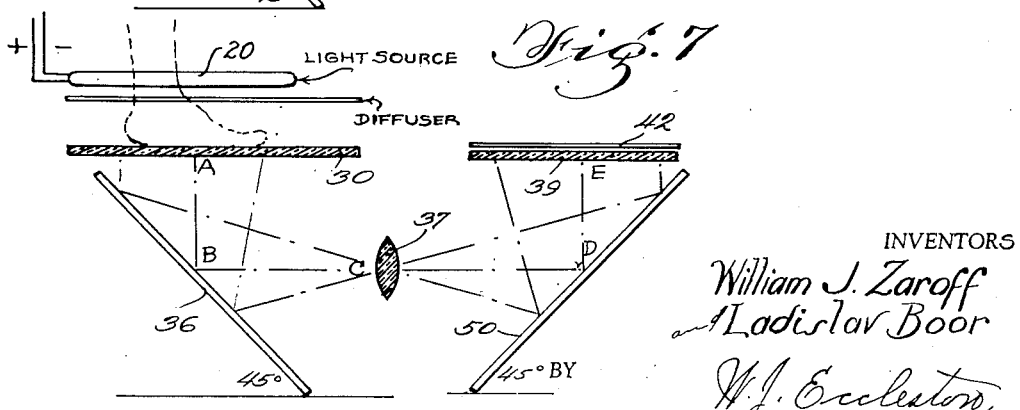

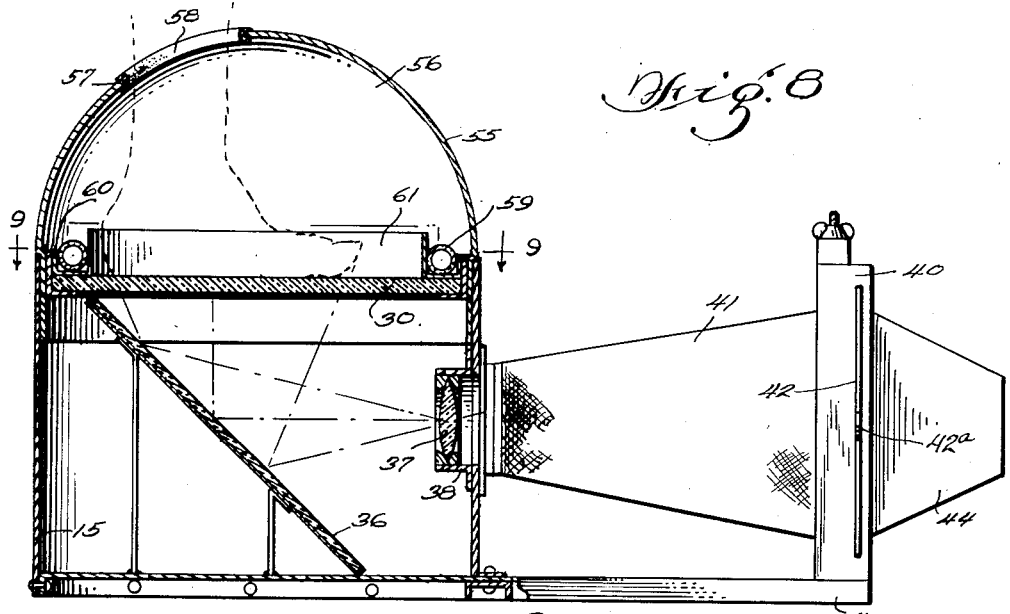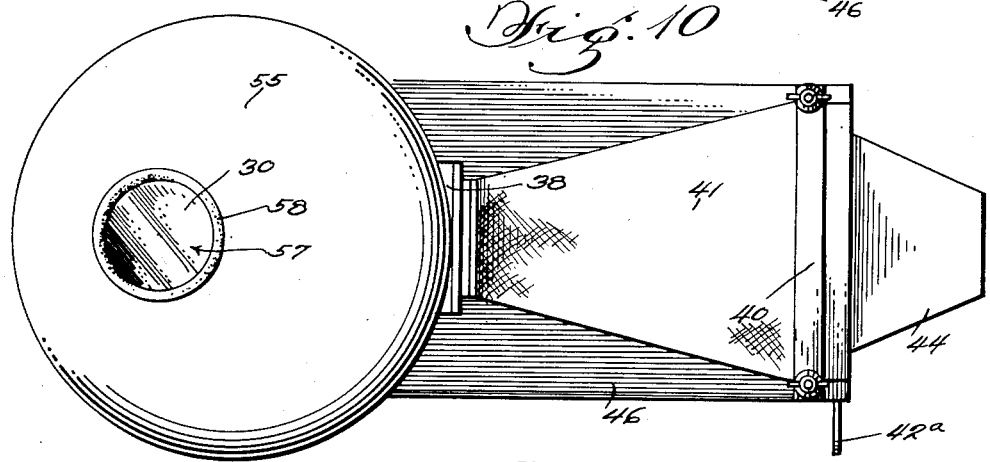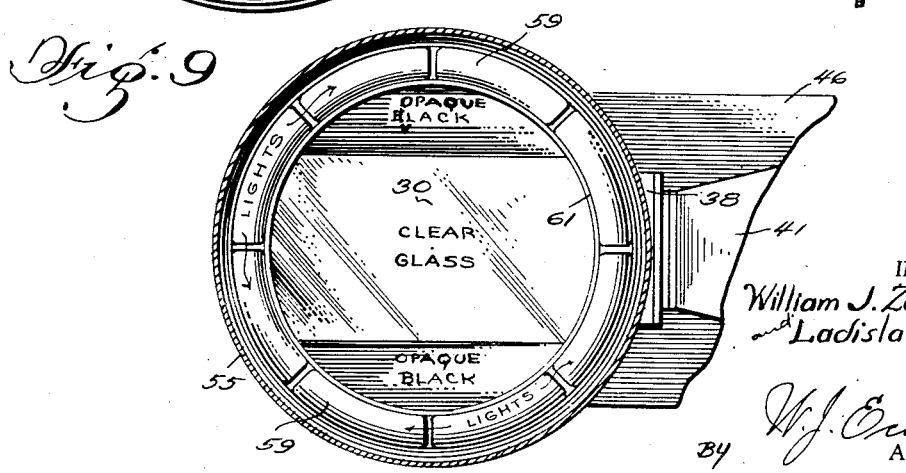

Patented Sept. 1, 1953

2,650,518

UNITED STATES PATENT OFFICE 2,650,518

APPARATUS FOR MEASURING FEET

William J. Zaroff, Philadelphia, Pa., and Ladislav Boor, Bethesda, Md., assignors to the United States of America as represented by the Secretary of the Army Application March 22, 1951, Serial No. 217,041

6 Claims. (Cl. 88—24)

(Granted under Title 35, U. S. Code (1952), sec. 266)

The invention described herein, if patented, may be manufactured and used by or for the Government for governmental purposes without the payment to us of any royalty thereon.

This invention relates to apparatus for measuring human feet, particularly while unconfined by shoes and under pressure from the weight of the body, so that an accurate idea of the proper size of boot or shoe may be obtained. The invention also provides apparatus for viewing and if desired photographing feet silhouettes.

There are a number of devices on the market intended for measuring feet so that they may be properly fitted with boots and shoes. The type which employs X-rays shows the foot confined by a shoe and hence not spread to its normal shape and size; this type of apparatus, moreover, has recently been condemned as potentially dangerous by public health authorities. The devices which serve as foot gauges are marked with scales and the person to be measured places his bare or stockinged foot (usually relaxed or not under pressure) on the gauge itself, whereupon the person making the measurement endeavors to visually project the outer surfaces or edges of the foot against the scales and then estimates, rather than measures, which shoe lengths and widths (marked on the scales) will be most likely to give a comfortable fit. If the angle of vision of the person making the measurement is off to one side, an improperly fitting shoe may be offered, and such a shoe may cause foot troubles. In a military organization on active duty, properly fitted boots and shoes are, of course, of major importance.

This invention aims to provide apparatus which will permit the viewing and measuring of a foot; also, if desired, photographing of the foot, as viewed from the bottom or sole. Unlike several devices of the prior art, the pressure areas of the sole of the foot are not seen or distinguished; the apparatus simply shows a dark area or silhouette surrounded by a bright area, which is a projection in lines at right angles to the transparent, lighted panel on which the foot stands. This projection is, however, accurate in that it is sharply defined and shows the extreme limits of width and length of the foot while under pressure from the weight of the body; and when such a projection is viewed against a properly marked translucent chart, the correct size of shoe may be immediately determined without any possibility of error arising from the position of the observer's eyes.

In a modified form, the projection or silhouette of the foot may be viewed and measured from above by anyone, including the person whose foot is being examined. In another form, the diffused light source is simplified as will be explained. In still another modification the foot is viewed (and, if desired, measured and photographed) in profile, so as to reveal any abnormal arch structure which would not appear in the projection or silhouette of the foot upon a transparent panel below the foot.

In the accompanying drawings forming a part of this specification,

Fig. 3 is an enlarged vertical section, showing in phantom a foot in position for a measurement;

Fig. 4 is a side elevation on the scale of Fig. 1, with certain parts removed;

Fig. 5 is another side elevation showing the chart frame and chart in position;

Fig. 6 is a diagram of the construction fully shown in Fig. 3;

Fig. 7 is a diagram of a modified arrangement which permits the person whose foot is measured to view his own foot;

Fig. 8 is a vertical section like Fig. 3 but on a smaller scale, showing a modified construction;

Fig. 9 is a horizontal section on line 9—9 of Fig. 8;

Fig. 10 is a top plan view of the device of Figs. 8 and 9.

Figure 1:
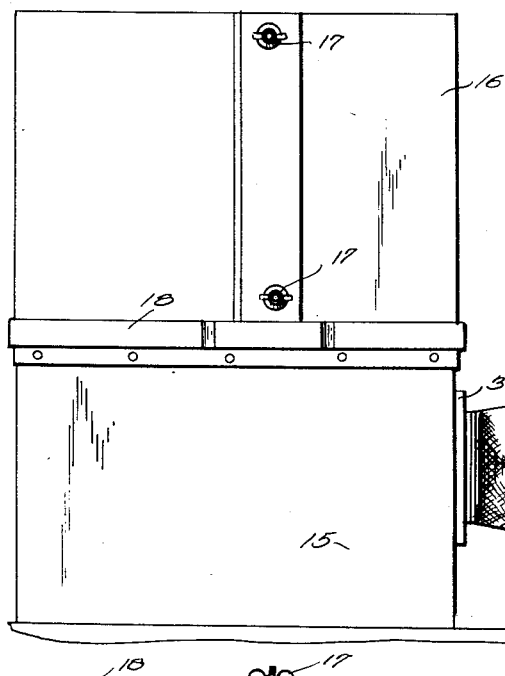
Fig. 1 is a side elevation of the apparatus.
Figure 2:
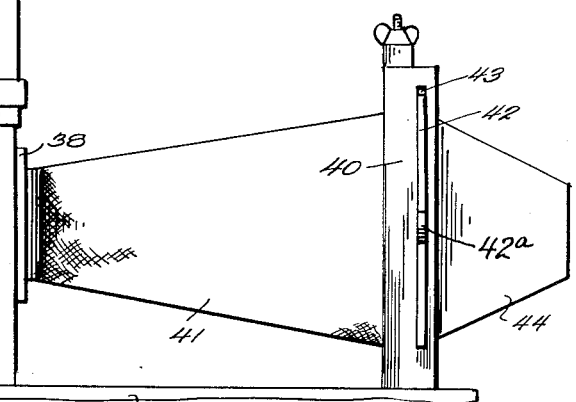
Fig. 2 is a top plan view, parts being broken away.
Figure 2:
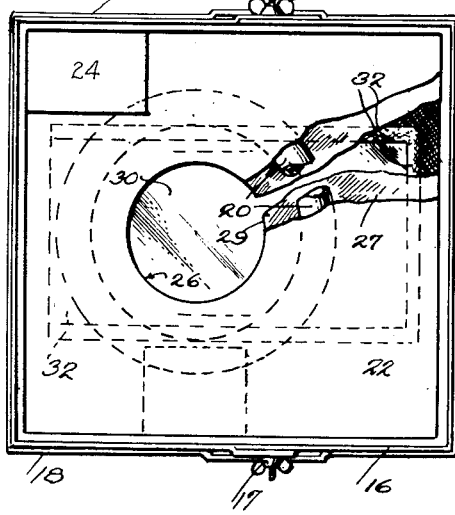
Figure 2:
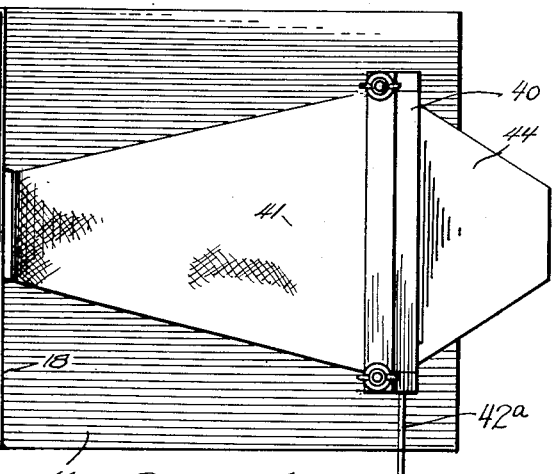

Referring particularly to the drawings, and first to Figs. 1 to 5 inclusive, the apparatus may include a lower rectangular box or casing 15, which is preferably provided with blackened inner walls to obviate reflection of light, and an upper removable shell or casing 16 which supports the light source and other parts and is open at the top to receive the foot. The shell or casing 16 may be of brightly polished metal to reflect the light; for convenience it is in two similar U-shaped parts secured together along their vertical edges by bolt and wing nut assemblies 17; and it rests edgewise within the channel provided by cleats 18 screwed or otherwise secured to the outside of lower box 15 adjacent its upper edges. Thus the upper shell or casing may be removed by merely lifting it off the lower box 15. In one form of the invention, the upper shell or casing was 18″ x 17″ x 13½″ high. However, if preferred, there may be only a single casing or housing supporting and enclosing a light source, a transparent foot support, and an optical system of the character hereinafter described.

The source of light may be several electric lamp bulbs (not shown) but for convenience of illustration is shown as an oval fluorescent lamp 20 supported by several conventional insulating hangers 21 screwed to the underside of a polished metal or white enameled reflector 22 which rests on several brackets 23 fixed to the inside walls of the upper shell or casing. A standard starting box 24 for the fluorescent lamp and a lamp cord 25 leading to a source of electricity, are also shown. All these parts are shown somewhat diagrammatically as the source of light may be constructed and arranged in many different ways. Reflector 22 is horizontal and has an opening 26 which is large enough to permit a foot to be inserted toe-first through the opening. Beneath the lamp 20 is a diffusing panel 27 resting on brackets 28 also fixed to the walls of the upper shell or casing. Diffusing panel 27 may be a plate of ground glass, or a translucent plastic, or it may be a sheet of ordinary draftsmen's tracing cloth stretched taut over a thin wire frame (not shown). Whatever its material, it must have a foot opening 29, as the foot to be measured must be supported below a source of diffused light, which obviously includes the diffusing panel 27. The foot openings 26, 29 may be circular as shown or oval, and should be at least 6" in diameter if circular, and may be about 6" x 9" if elliptical. It will be clear that the lamp 20, reflector 22 and diffusing panel 27 together constitute a source of diffused light above the foot which is to be measured.

To support the foot while under pressure and hence spread by the weight of the body, a heavy clear glass plate 30 or a transparent panel of any material having the necessary strength is supported on a horizontal rectangular open frame 31, which may be of plywood. Black tape or cloth 32 may be glued to the top of the open frame 31 and to the adjacent edges of the glass plate, also over the joints between frame 31 and the walls of the casing, to hold said plate against slight lateral movements and to provide a light seal surrounding the transparent glass plate. Brackets 33 secured to the side walls of box 15 support frame 31 upon the lower box, or, if preferred, a number of thin sheet metal hangers (not shown) screwed at their upper ends to the top edges of box 15 may extend downwardly alongside the inner walls of the box and may have their lower ends bent at right angles to provide horizontal flanges to which frame 31 is screwed.

Supported on a pedestal 35 within the black box 15 is a mirror 36 held at a 45° angle. As shown, this mirror has its top edge adjacent the underside of glass plate 30, but in actual practice, there may be a space of several inches between these parts. The dark image or silhouette of the foot thrown on mirror 36 by the light source previously described is projected through a lens 37 mounted on a lens holder 38 supported in one wall of the black box 15. Lens 37 is shown as a simple convex or converging lens; in practice an anastigmatic lens may be employed advantageously. From lens holder 38, the light is projected to a screen which is preferably a ground glass plate 39 slidable in a vertical frame 40. It does not matter that the lens shown reverses the images of the foot; if it is desired to have the toe end of the foot image uppermost (let us say) on the screen 39 the person whose foot is to be viewed may be told to face in the proper direction to bring about this result.

To prevent outside light from obscuring the image, an opaque fabric envelope 41 (which may be a black camera bellows) is attached to lens holder 38 at one end and to frame 40 at the other end, with the necessary seals to insure that only light from the mirror 36 is transmitted to the ground glass plate 39. Directly in front of the ground glass plate is a thin, transparent, flexible plastic chart member 42 having a handle 42a, said chart member being shown marked with vertical and horizontal lines forming width and length scales. Suitable indicia (not shown) are, of course, marked on the chart. Frame 40 has a narrow slot 43 in one side (Fig. 1) long enough to slidably receive the plastic chart, with the handle extending outwardly for manipulation of the chart so as to bring its base or zero lines in line with some of the edges of the silhouetted image on the ground glass plate. A tapering screen 44 of some black fabric or black painted metal is fixed to and extends outwardly from frame 40 and has an opening 45 at the opposite end through which the person making the measurement peers at said image. This screen, of course, prevents light from outside sources creating reflections on the plastic chart 42 and/or the ground glass plate 39 such as would interfere with clear vision of said image. All the parts of the apparatus may be mounted on or carried by a flat board or base 46, permitting the user to pick up the device and move it about. In place of the ground glass which images the outline of the foot may be inserted a plate holder, loaded with a light-sensitive film or paper, thus permitting a photographic record of the outline of the foot, or a camera 47 (Fig. 6) may make a permanent photographic record of any size of any or all the images cast on the ground glass plate 39, and if desired, the photographs may show names, numbers or other identifying matter, which may be placed on top of the clear glass plate 30.

The described apparatus was designed for observing and measuring one foot at a time; however, its dimensions obviously may be enlarged so as to accommodate both feet, whereupon there will be two images projected on the ground glass plate 39. In such a case, there should be two charts, one for the left foot, the other for the right foot. As there will be some loss in light efficiency due to the large opening which must be provided for two feet standing side by side, it may be preferred to employ two of the described apparatuses arranged side by side, and on the same level, one for each foot. If only one apparatus is used for measuring one foot at a time, provision should be made for a base on which the foot not being measured may stand, and that base must be on the same level as the heavy glass plate 30, so that there will be no abnormal distribution of the weight of the body on the feet while one of the feet is being measured.

In all the described arrangements of apparatus, if it is desired to have an image or silhouette of precisely the same size as the foot itself, then the distance from the top of the heavy glass plate 30 to the mirror 36, plus the distance from the mirror surface to the lens 37, equals the distance from lens 37 to the ground glass plate 39, or as shown in Fig. 6, $AB+BC=CD$. If a different sized image is preferred, the plane supporting the foot, the lens, and the ground glass plate 39 are so disposed as to achieve the requisite reduction or enlargement, and the measuring scale will be correspondingly calibrated.

As shown in Fig. 7, it is possible to have the ground glass panel 39 horizontal, with a horizontal chart, permitting reading of the foot sizes from above or even by the person whose foot is being measured, provided there is a second plane mirror 50 arranged on the opposite side of lens 37 from mirror 36, and having its surface at an angle of 90° relative to the surface of mirror 36. In other words, mirror 50 is at an angle of 45° and mirror 36 it as an angle of 135° relative to the horizontal, with lens 37 midway between both mirrors. In this arrangement, $$AB+BC=CD+DE$$

Now referring to Figs. 8, 9 and 10, where the same parts shown in Figs. 1–7 are designated by the same reference numerals, a hemispherical dome 55 has a light-reflecting and diffusing surface 56 on the inside. Such a surface may be a sprayed aluminum surface layer, or its equivalent. An opening 57 is provided for the foot, and an edging 58 of rubber or a soft fabric surrounds said opening to obviate cutting or scratching the foot. The light source is a circular fluorescent tube or a series of incandescent bulbs (not shown) or a series of short fluorescent tubes 59 arranged in a circular series adjacent the circular bottom edge of the reflecting dome. A circular reflector 60 has a channel form to receive the series of tubes 59 and throws the light upwardly against diffusing surface 56, where the light is reflected many times to give a substantially uniform glow or radiance over the entire surface 56. Reflector 60, however, has an inner circular flange 61 which shields the foot against direct illumination from the light source 59. The image cast by this apparatus is the same as the image resulting from the apparatus of Figs. 1–5.

If preferred, the glass plate 39 may be movably mounted, with springs to hold it off its support, said springs being yieldable under the weight of the person standing on the plate to allow the plate to move toward its support. A switch, built in the support, and connected in circuit with the lamp or lamps, may be closed whenever the plate is stepped upon, thereby to light up the apparatus for use. Such an arrangement would be desirable to save electric current, as the light would be off at all times except when the apparatus is actually in use; also, in warm weather the lighted upper chamber or casing would not become heated so highly as to be uncomfortable if the suggested arrangement is used. Also, if desired, the substantially closed chamber in which the foot stands when being measured may be provided with a ventilating fan. Neither of these suggested modifications is shown, as it is thought those skilled in the art may be able to incorporate the additional elements by resorting to the knowledge and skill of average mechanics.

What we claim is:

1. Apparatus for viewing feet comprising, in combination, a source of diffused artificial light; a casing for confining the light, said casing having an opening at its top admitting the foot; a transparent horizontal panel fixed within the casing below the source of diffused light and adapted to support the weight of the body of the subject when standing on said panel; a mirror set within the casing below said transparent panel so as to receive the image of the foot when the foot is supported on said transparent panel so as to be interposed between the source of light and the mirror; said mirror projecting a reflected image of the foot substantially at right angles to the sole of the foot; a lens and holder therefor set so as to receive said reflected image; and a translucent screen supported so as to receive said reflected image from the opposite side of said lens.

2. The invention defined in claim 1, wherein there is a second mirror supported on said opposite side of said lens adapted to receive said reflected image and project it in a path at right angles to the projection of the first-mentioned mirror, and the translucent screen receives the second reflected image in a plane which is parallel to the sole of the foot, or in the same plane as but spaced from the sole of the foot.

3. Apparatus for measuring feet while under pressure from the weight of the body comprising, in combination, a transparent panel and support therefor strong enough to withstand the weight of the body; a source of diffused artificial light so constructed and arranged as to throw light upon the top of the foot when supported on said transparent panel and also on the panel itself; means to confine the light from said source principally to the neighborhood of the panel; a translucent screen at a point removed from the transparent panel; and an optical system interposed between the underside of the transparent panel and the translucent screen and constructed and arranged to throw a silhouette or image of the foot upon the translucent screen.

4. The invention defined in claim 3, wherein there is a transparent flat chart having indicia or scales marked thereon, and means to hold the chart adjacent the translucent screen thereby to give measurements of the foot supported on the transparent panel.

5. Apparatus for viewing feet comprising, in combination, a source of diffused artificial light; a casing surrounding the source of light and confining the light and reflecting the light downwardly, said casing having a foot opening in its top; a transparent panel within the casing below the foot opening and lying horizontally, means supporting the panel within the casing so that it may support a foot thrust through said opening; a mirror within the casing below the transparent panel and receiving the silhouetted image of the foot from the transparent panel, said mirror being at 45° relative to the transparent panel; a lens and holder therefor receiving the reflected image projected by the mirror; a translucent screen; and a support for said screen to hold the same so that it may receive said reflected image from the opposite side of said lens.

6. The invention defined in claim 5, wherein there is a thin, transparent, flexible plastic chart member marked with lines to show foot lengths and widths, said chart member having a handle so that it may be positioned properly relative to the image or silhouette of the foot on said screen, said screen support receiving said chart member so that the latter lies alongside the screen substantially in contact therewith.

WILLIAM J. ZAROFF.
LADISLAV BOOR.

References Cited in the file of this patent

UNITED STATES PATENTS

| Number | Name | Date |
| --- | --- | --- |
| 696,877 | Mackintosh | Apr. 1, 1902 |
| 1,643,626 | May | Sept. 27, 1927 |
| 2,100,967 | Levy | Nov. 30, 1937 |
| 2,325,490 | Elftman | July 27, 1943 |
| 2,382,131 | Cameron | Aug. 14, 1945 |
| 2,422,611 | Becker | June 17, 1947 |